US011474707B2

(12) United States Patent
Carson et al.

(10) Patent No.: US 11,474,707 B2
(45) Date of Patent: Oct. 18, 2022

(54) DATA LOSS RECOVERY IN A SECONDARY STORAGE CONTROLLER FROM A PRIMARY STORAGE CONTROLLER

(71) Applicant: INTERNATIONAL BUSINESS MACHINES CORPORATION, Armonk, NY (US)

(72) Inventors: Matthew D. Carson, Pasadena, CA (US); Carol S. Mellgren, Tucson, AZ (US); Karl A. Nielsen, Tucson, AZ (US); Matthew Sanchez, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 15/172,774

(22) Filed: Jun. 3, 2016

(65) Prior Publication Data

US 2017/0351440 A1    Dec. 7, 2017

(51) Int. Cl.
  *G06F 3/06*     (2006.01)
  *G06F 11/14*    (2006.01)
  *G06F 11/16*    (2006.01)

(52) U.S. Cl.
  CPC ............ *G06F 3/0619* (2013.01); *G06F 3/065* (2013.01); *G06F 3/0689* (2013.01); *G06F 11/14* (2013.01); *G06F 11/1662* (2013.01)

(58) Field of Classification Search
  CPC .... G06F 3/0619; G06F 3/0685; G06F 3/0665; G06F 3/065; G06F 3/0689; G06F 11/14; G06F 11/1662

USPC ........................................................ 711/112
See application file for complete search history.

(56) References Cited

U.S. PATENT DOCUMENTS

| | | | | |
|---|---|---|---|---|
| 6,199,074 | B1 * | 3/2001 | Kern ................... | G06F 11/2082 |
| 7,512,835 | B2 * | 3/2009 | Bartfai ............... | G06F 11/2058 |
| | | | | 714/6.23 |
| 8,914,605 | B2 * | 12/2014 | Grusy .................. | G06F 3/0638 |
| | | | | 707/822 |
| 9,092,449 | B2 * | 7/2015 | Brown ................. | G06F 3/0619 |
| 9,298,567 | B2 * | 3/2016 | Blea ..................... | G06F 11/2069 |
| 9,323,464 | B2 * | 4/2016 | Benhase ............... | G06F 3/0617 |
| 9,501,327 | B2 * | 11/2016 | Brown ............... | G06F 17/30943 |
| 9,547,528 | B1 * | 1/2017 | McClure .............. | G06F 9/4881 |
| 2004/0064639 | A1 * | 4/2004 | Sicola ................. | G06F 11/2007 |
| | | | | 711/143 |
| 2006/0179343 | A1 * | 8/2006 | Kitamura ........... | G06F 11/2069 |
| | | | | 714/6.23 |

(Continued)

OTHER PUBLICATIONS

StorageTek, Peer-to-Peer Remote Configuration and User Guide. Storage Technology Corporation (2005) (Year: 2005).*

*Primary Examiner* — Michael Krofcheck
(74) *Attorney, Agent, or Firm* — Konrad Raynes Davda & Victor LLP; Rabindranath Dutta (57) ABSTRACT

A secondary storage controller determines one or more tracks of one or more volumes in which data loss has occurred in the secondary storage controller. The secondary storage controller suspends a peer to peer remote copy operation between the secondary storage controller and a primary storage controller. Information on the one or more tracks of the one or more volumes in which the data loss has occurred is transmitted to the primary storage controller.

20 Claims, 9 Drawing Sheets

(56) References Cited

U.S. PATENT DOCUMENTS

| | | | |
|---|---|---|---|
| 2007/0061531 A1* | 3/2007 | Bartfai | G06F 11/2082 |
| | | | 714/E11.102 |
| 2008/0065843 A1* | 3/2008 | Bartfai | G06F 11/2058 |
| | | | 711/162 |
| 2011/0208694 A1* | 8/2011 | Bitar | G06F 11/2058 |
| | | | 707/610 |
| 2013/0013566 A1 | 1/2013 | Miller et al. | |
| 2015/0286545 A1* | 10/2015 | Brown | G06F 11/2058 |
| | | | 714/6.23 |

* cited by examiner

DATA LOSS RECOVERY IN A SECONDARY STORAGE CONTROLLER FROM A PRIMARY STORAGE CONTROLLER

BACKGROUND

1. Field

Embodiments relate to mechanisms for data loss recovery in a secondary storage controller from a primary storage controller.

2. Background

A storage controller may control access to storage for one or more host computational devices that may be coupled to the storage system over a network. A storage management application that executes in the storage controller may manage a plurality of storage devices, such as disk drives, tape drives, flash drives, direct access storage devices (DASD), etc., that are coupled to the storage system. A host may send Input/Output (I/O) commands to the storage controller and the storage controller may execute the I/O commands to read data from the storage devices or write data to the storage devices.

Peer to Peer Remote Copy or PPRC is a protocol to replicate a storage volume from one storage controller to another storage controller in a remote site. Synchronous PPRC causes each write to the primary volume to be performed to the secondary volume as well, and the input/output (I/O) is only considered complete when update to both primary and secondary have completed. Asynchronous PPRC may flag tracks on the primary storage controller to be duplicated to the secondary storage controller when time permits.

SUMMARY OF THE PREFERRED EMBODIMENTS

Provided are a method, a system, a computer program product in which a secondary storage controller determines one or more tracks of one or more volumes in which data loss has occurred in the secondary storage controller. The secondary storage controller suspends a peer to peer remote copy operation between the secondary storage controller and a primary storage controller. Information on the one or more tracks of the one or more volumes in which the data loss has occurred is transmitted to the primary storage controller.

In certain embodiments, the secondary storage controller accumulates over a period of time the information on the one or more tracks of the one or more volumes in which the data loss has occurred, prior to transmitting of any part of the information to the primary storage controller.

In further embodiments, in response to an unsuspension of the peer to peer remote copy operation, the secondary storage controller receives via the peer to peer remote copy operation, data stored in the primary storage controller to restore data that was lost in the one or more tracks of the one or more volumes of the secondary storage controller.

In additional embodiments, the one or more tracks comprise a first track and a second track of a volume. In response to an unsuspension of the peer to peer remote copy operation, the secondary storage controller receives data stored in the primary storage controller to restore data in a range of tracks starting from the first track to the second track of the volume of the secondary storage controller to recover from the data loss.

In further embodiments, existing code to perform the peer to peer remote copy operation between the primary storage controller and the secondary storage controller remains unchanged in the primary storage controller, wherein a data structure is updated in the primary storage controller to indicate that data of the one or more tracks of the one or more volumes are to be transmitted on continuation of the peer to peer remote copy operation to the secondary storage controller.

In yet additional embodiments, a tertiary storage controller determines a set of tracks of a volume in which data loss has occurred in the tertiary storage controller. The tertiary storage controller suspends another peer to peer remote copy operation between the tertiary storage controller and the secondary storage controller. The tertiary storage controller transmits information on the set of tracks of the volume in which the data loss has occurred to the secondary storage controller.

In further embodiments, the secondary storage controller is a first secondary storage controller, wherein a multi-target peer to peer remote copy operation is in progress from the primary storage controller to the first secondary storage controller and a second secondary storage controller. The second secondary storage controller determines a set of tracks of a volume in which data loss has occurred in the second secondary storage controller. The second secondary storage controller suspends another peer to peer remote copy operation between the second secondary storage controller and the primary storage controller. The second secondary storage controller transmits information on the set of tracks of the volume in which data loss has occurred to the primary storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In high end storage solutions one of the most important design points is to avoid data loss. Unfortunately even with technologies such as Redundant Array of Independent Disks (RAID), data loss can still occur under certain situations. One such scenario is during an RAID array rebuild in which if any of the drives in the same array encounter an unrecoverable media error, then data loss may be encountered as the data can no longer be reconstructed for that portion of the array.

In certain storage systems copy service functionality allows for multiple copies of the data to be maintained asynchronously or synchronously. Thus in certain storage solutions that deploy copy service technology, if data is lost due to media errors on one storage system, then another copy of the data exists on a remote storage system. However there is no mechanism to restore the data automatically, and the customer has to go through a manual process to restore the data from a backup copy. Certain embodiments provide mechanisms to recovery from data loss on a peer to peer remote copy (PPRC) secondary volume(s) automatically. Currently when data loss occurs on a PPRC secondary volume the entire volume has to be manually restored from backup. If many volumes have been affected or if the volumes are very large this process can take a very long time, and thus the recovery time may be extended. In certain embodiments, the storage systems keep track of which tracks have been lost and only restores those tracks or a range of tracks for the given volume.

In certain embodiments, when data loss occurs on a PPRC secondary volume, mechanisms are provided to keep track of all the tracks that have been lost. This list of tracks are used to create a range of tracks for each affected volume that need to be restored from the primary storage system. This range of tracks for each volume is transferred to the primary storage system. On the primary storage system this list of tracks is added to a data structure, such as a data structure called the out of synchronization (OOS) bit map. When the OOS bit map is processed the range of tracks that are needed to recover the data loss is sent from the primary system to the secondary system, thus recovering from the data loss on the secondary system.

Exemplary Embodiments

Figure 1:
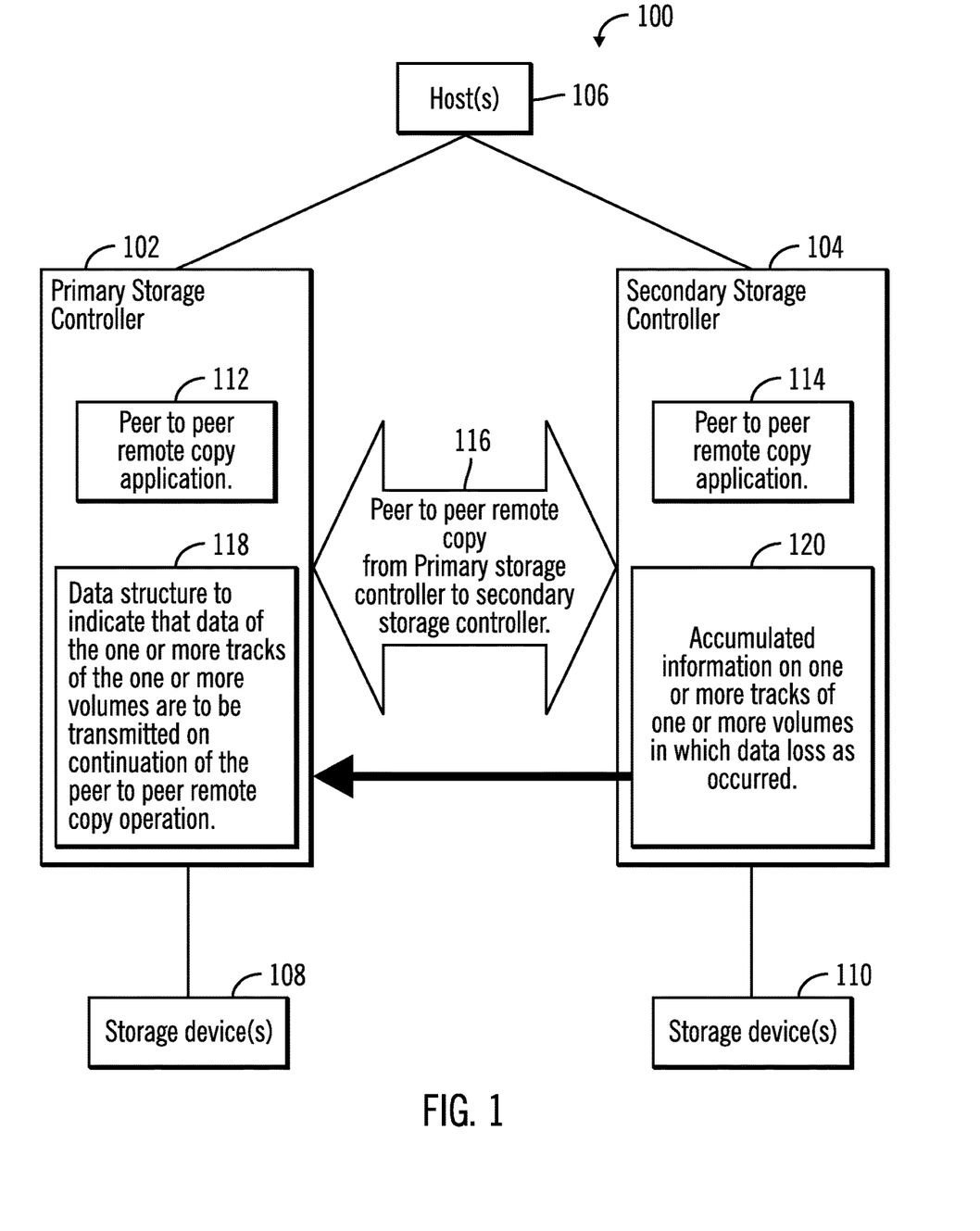
FIG. 1 illustrates a block diagram of a computing environment comprising a primary storage controller and a secondary storage controller in a peer to peer remote copy relationship, in accordance with certain embodiments.

FIG. 1 illustrates a block diagram of a computing environment 100 comprising a primary storage controller 102 coupled to a secondary storage controller 104. The primary storage controller 102 and the secondary storage controller 104 are configurable to be in communication with one or more hosts communicates with a plurality of hosts 106 over a network, in accordance with certain embodiments.

The storage controllers 102, 104 and the hosts 106 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The storage controllers 102, 104 and the hosts 106 may be elements in any suitable network, such as, a storage area network, a wide area network, the Internet, an intranet. In certain embodiments, the storage controllers 102, 104 and the hosts 106 may be elements in a cloud computing environment.

The primary storage controller 102 may manage a plurality of storage devices 108 and the secondary storage controller 104 may manage a plurality of storage device 110. The primary storage controller 102 may include a peer to peer remote copy application 112 and the secondary storage controller 104 may also include a peer to peer remote copy application 114. The peer to peer remote copy applications 112, 114 allow peer to peer remote copy operations from the primary storage controller 102 to the secondary storage controller 104 (as shown via reference numeral 116).

The primary storage controller maintains a data structure 118 that may comprise an OOS bitmap to synchronize primary storage controller volumes to secondary storage controller volumes during a peer to peer remote copy operations.

In certain embodiments, the secondary storage controller 104 may accumulate information in a data structure 120 on one or more tracks of one or more volumes in which data loss has occurred.

Figure 2:
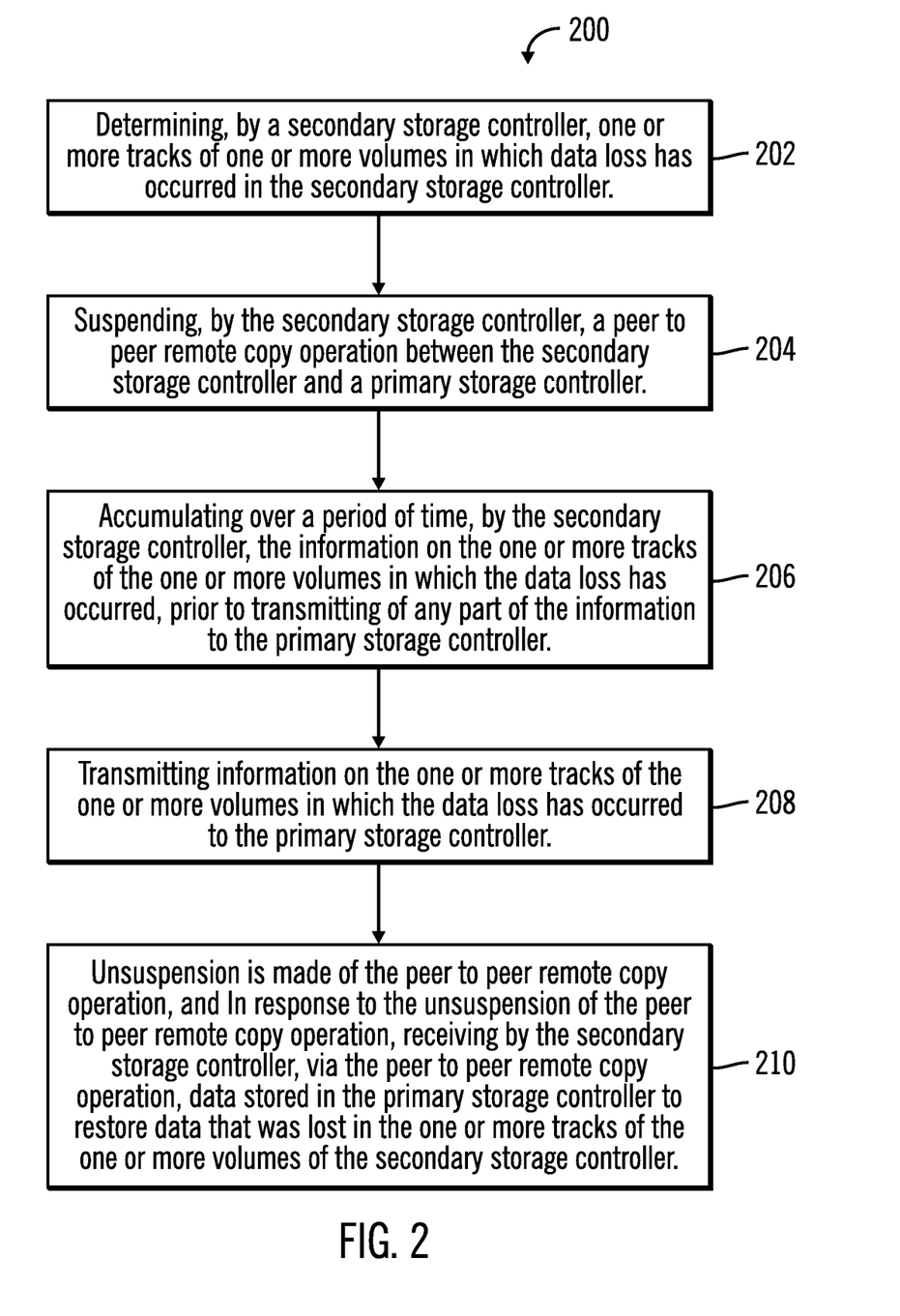
FIG. 2 illustrates a flowchart of operations performed by a secondary storage controller in the computing environment of FIG. 1 to recover from a data loss, in accordance with certain embodiments.

FIG. 2 illustrates a flowchart 200 of operations performed by the secondary storage controller 104 in the computing environment 100 of FIG. 1 to recover from a data loss, in accordance with certain embodiments.

Control starts at block 202 in which the secondary storage controller 104 determines one or more tracks of one or more volumes in which data loss has occurred in the secondary storage controller 104. The secondary storage controller 104 suspends (at block 204) a peer to peer remote copy operation 116 between the secondary storage controller 104 and the primary storage controller 102.

Control proceeds to block 206, in which the secondary storage controller 104 accumulates over a period of time the information on the one or more tracks of the one or more volumes in which the data loss has occurred. Control proceeds to block 208, in which the accumulated information 120 on the one or more tracks of the one or more volumes in which the data loss has occurred is transmitted to the primary storage controller 102. By accumulating the information over a period of time and transmitting the accumulated information processing time is saved in the secondary storage controller 104 and the primary storage controller 102, as repeated interruptions of the primary storage controller 102 from the secondary storage controller 104 is avoided.

From block 208, control proceeds to block 210, where an unsuspension is made by the secondary storage controller 104 of the suspended peer to peer remote copy operation 116. In response the unsuspension of the peer to peer remote copy operation 116, the secondary storage controller 104 receives via the peer to peer remote copy operation 116, data stored in the primary storage controller 102 to restore data that was lost in the one or more tracks of the one or more volumes of the secondary storage controller 104.

To perform the operations shown in FIG. 2, existing code to perform the peer to peer remote copy operation between the primary storage controller 102 and the secondary storage controller 104 remains unchanged in the primary storage controller 102. The data structure 118 (e.g., an 00S bitmap) is updated in the primary storage controller 102 on receiving the accumulated information 120 to indicate that data of the one or more tracks of the one or more volumes are to be transmitted on continuation of the peer to peer remote copy operation to the secondary storage controller 104.

Figure 3:
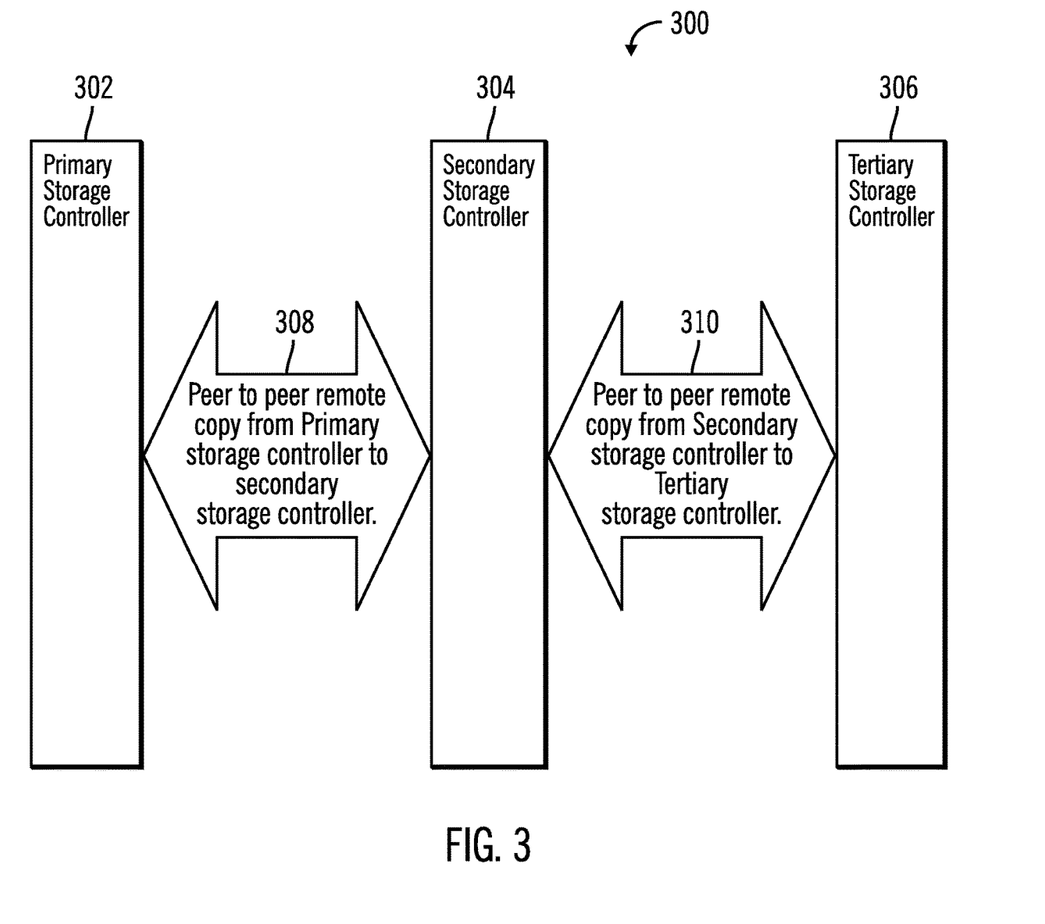
FIG. 3 illustrates a block diagram of a computing environment comprising a primary storage controller, a secondary storage controller, and a tertiary storage controller, in accordance with certain embodiments.

FIG. 3 illustrates a block diagram of a computing environment 300 comprising a primary storage controller 302, a secondary storage controller 304, and a tertiary storage controller 304, in accordance with certain embodiments. The primary storage controller 302 is in a peer to peer remote copy relationship 308 with the secondary storage controller 304, and the secondary storage controller 304 is in a peer to peer remote copy relationship 310 with the tertiary storage controller 306.

Therefore, in FIG. 3 storage volumes are copied from the primary storage controller 302 to the secondary storage controller 304, and also from the secondary storage controller 304 to the tertiary storage controller 306.

Figure 4:
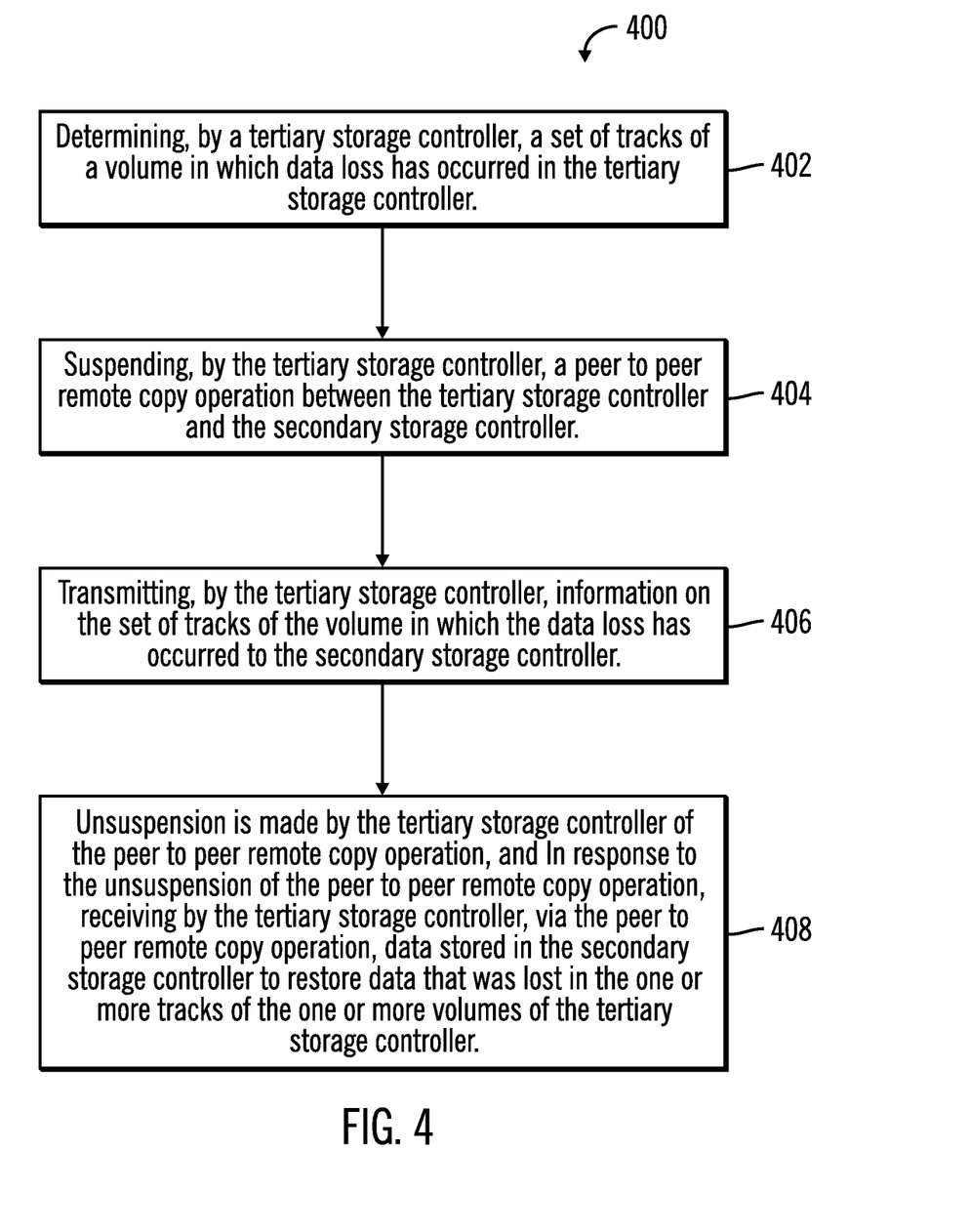
FIG. 4 illustrates a flowchart of operations performed by a tertiary storage controller in the computing environment of FIG. 3 to recover from a data loss in accordance with certain embodiments.

FIG. 4 illustrates a flowchart 400 of operations performed by a tertiary storage controller 306 in the computing environment 300 of FIG. 3 to recover from a data loss in accordance with certain embodiments.

Control starts at block 402 in which the tertiary storage controller 306 determines a set of tracks of a volume in which data loss has occurred in the tertiary storage controller 306. The tertiary storage controller 306 suspends (at block 404) a peer to peer remote copy operation 310 between the tertiary storage controller 306 and the secondary storage controller 304. The tertiary storage controller 306 then transmits (at block 406) information on the set of tracks of the volume in which the data loss has occurred to the secondary storage controller 304.

From block 406, control proceeds to block 408, where an unsuspension is made by the tertiary storage controller 306 of the suspended peer to peer remote copy operation 310. In response the unsuspension of the peer to peer remote copy operation 310, the tertiary storage controller 104 receives via the peer to peer remote copy operation 310, data stored in the secondary storage controller 304 to restore data that was lost in the one or more tracks of the one or more volumes of the tertiary storage controller 306.

Figure 5:
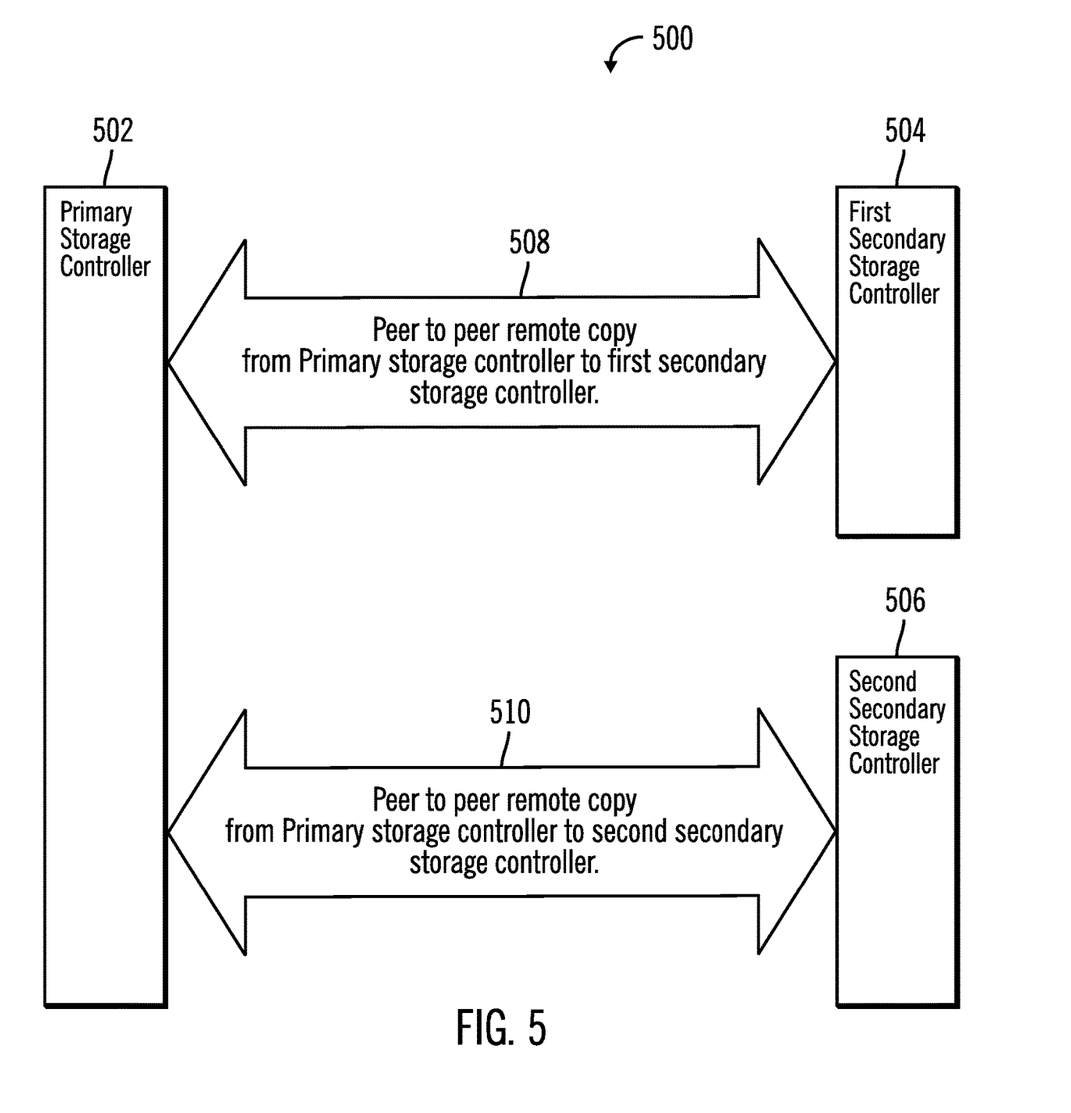
FIG. 5 illustrates a block diagram of a computing environment comprising a primary storage controller in peer to peer remote copy relationships with a first secondary storage controller and a second secondary storage controller, in accordance with certain embodiments.

FIG. 5 illustrates a block diagram of a computing environment 500 comprising a primary storage controller 502 in peer to peer remote copy relationships 508, 510 with a first secondary storage controller 504 and a second secondary storage controller 506, in accordance with certain embodiments. Volumes are copied from the primary storage controller 502 to the first secondary storage controller 504 via peer to peer remote copy 508. Additionally volumes may also be copied from the primary storage controller 502 to the second secondary storage controller 506 via peer to peer remote copy 510.

Figure 6:
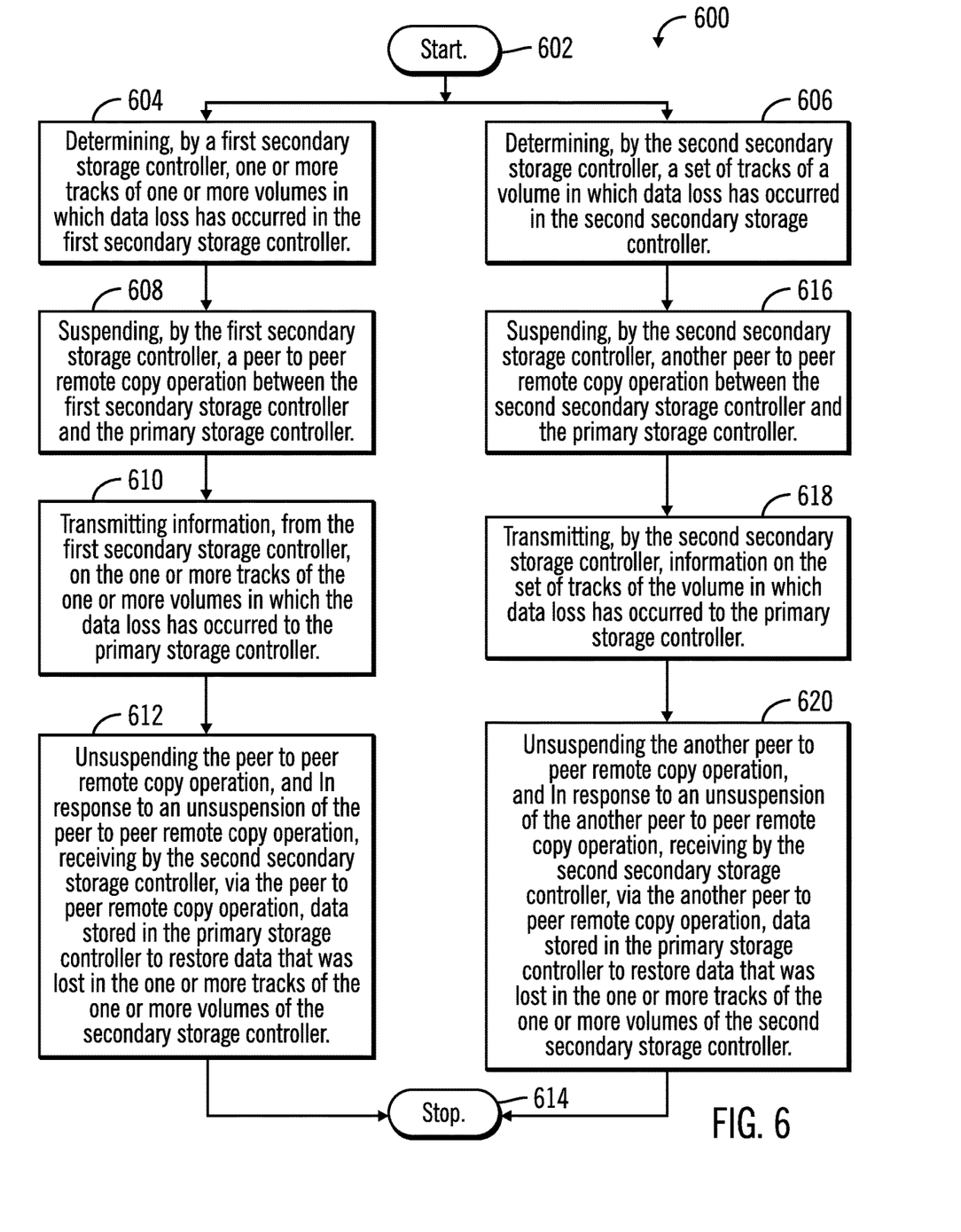
FIG. 6 illustrates a flowchart of operations performed by a the first storage secondary controller and the second secondary storage controller in the computing environment of FIG. 5 to recover from a data loss, in accordance with certain embodiments.

FIG. 6 illustrates a flowchart 600 of operations performed by a the first secondary storage controller 504 and the second secondary storage controller 506 in the computing environment 500 of FIG. 5 to recover from data loss, in accordance with certain embodiments.

Control starts at block 602 and proceeds in parallel to block 604 and 606.

At block 604, the first secondary storage controller 504 determines one or more tracks of one or more volumes in which data loss has occurred in the first secondary storage controller 504. The first secondary storage controller 504 suspends (at block 608) a peer to peer remote copy operation 508 between the first secondary storage controller 504 and the primary storage controller 502.

From block 608 control proceeds to block 610, in which the first secondary storage controller 504 first accumulates over a period of time the information on the one or more tracks of the one or more volumes in which the data loss has occurred, and then transmits the accumulated information on the one or more tracks of the one or more volumes in which the data loss has occurred to the primary storage controller 502. By accumulating the information over a period of time and transmitting the accumulated information processing time is saved in the first secondary storage controller 504 and the primary storage controller 502, as repeated interruptions of the primary storage controller 502 from the first secondary storage controller 504 is avoided.

From block 610, control proceeds to block 612 where an unsuspension is made by the first secondary storage controller 504 of the suspended peer to peer remote copy operation 508. In response the unsuspension of the peer to peer remote copy operation 508, the first secondary storage controller 504 receives via the peer to peer remote copy operation 508, data stored in the primary storage controller 502 to restore data that was lost in the one or more tracks of the one or more volumes of the first secondary storage controller 504. Then the process stops (at block 614).

In parallel to the operations 604, 608, 610, 612 being performed by the first secondary storage controller 504, the second secondary storage controller 506 may perform operations shown in blocks 606, 616, 618, 620.

At block 606 the second secondary storage controller 506 determines one or more tracks of one or more volumes in which data loss has occurred in the second secondary storage controller 506. The second secondary storage controller 506 suspends (at block 616) a peer to peer remote copy operation 510 between the second secondary storage controller 506 and the primary storage controller 502.

From block 616 control proceeds to block 618, in which the second secondary storage controller 506 accumulates over a period of time the information on the one or more tracks of the one or more volumes in which the data loss has occurred. In block 618 the accumulated information on the one or more tracks of the one or more volumes in which the data loss has occurred is transmitted to the primary storage controller 502. By accumulating the information over a period of time and transmitting the accumulated information processing time is saved in the second secondary storage controller 506 and the primary storage controller 502, as repeated interruptions of the primary storage controller 502 from the second secondary storage controller 506 is avoided.

From block 618, control proceeds to block 620 where an unsuspension is made by the second secondary storage controller 506 of the suspended peer to peer remote copy operation 510. In response the unsuspension of the peer to peer remote copy operation 510, the second secondary storage controller 506 receives via the peer to peer remote copy operation 510, data stored in the primary storage controller 502 to restore data that was lost in the one or more tracks of the one or more volumes of the second secondary storage controller 506. Then the process stops (at block 614).

To perform the operations shown in FIG. 6, existing code to perform the peer to peer remote copy operations 508, 510 between the primary storage controller 502 and the first and second secondary storage controllers 504, 506 remains unchanged in the primary storage controller 502. Data structures (e.g., an 00S bitmaps) are updated in the primary storage controller 502 on receiving the accumulated information from the first secondary storage controller 504 and/or the second secondary storage controller 506 to indicate that data of the one or more tracks of the one or more volumes are to be transmitted from the primary storage controller 502 on continuation of one or more of the peer to peer remote copy operation 508, 510.

Therefore, FIGS. 1-6 illustrate embodiments to recovery from data loss in one or more secondary storage controllers and in tertiary storage controllers.

Additional Embodiments

In certain embodiments, if data loss happens on enterprise storage system the following is performed by an application. The application checks to see if a lost track is a PPRC secondary track and if it is, then the application performs the following:
(1) Create a list of each PPRC secondary track that has been affected.
(2) Create a list that keeps track of all the volumes that encountered data loss, and a range of track that needs to be recovered for that volume from the primary system (a startTrack and endTrack data structures show the range).
(3) Send a message to the host system for each affected volume to notify the host that data loss has occurred and a remote copy restore will be attempted.
(4) Queue a timer to process the lost track volume list for a given amount of time (e.g. 5 seconds). For each additional track that is lost this timer is requeued for another 5 seconds. Thus the task to process the list will get dispatched 5 seconds after the last data loss track has been seen, or at least no more data loss has been seen for 5 seconds.
(5) When the "process volume list" task is dispatched (once no data loss has been seen for 5 seconds) do the following: (a) Cycle through the list and for each affected volume; (b) Call the copy service code component with a range of tracks (startTrack and endTrack that need to be restored from the remote copy of data; (c) The copy service component will add these volumes an range of tracks to their meta data "Volumes Needing Restored" structure. This structure is non-volatile so once it is in this metadata even if the system reboots or shuts down the lost tracks will be restored at some point; (d) The copy service component then suspends the PPRC relationship. The suspend reason code indicates that this suspension was done because data loss occurred on the secondary system and on un-suspend of the PPRC relationship the data will be recovered; (e) the copy service code component then calls back the calling component to indicate that this volume and range of tracks has been successfully added to the copy service meta data structure; (f) the copy service code updates the volume list log for this volume with the status that it has been added to the copy service meta data structure.
(6) If more tracks encounter data loss at this point the process the previous process repeats.
(7) 10 Minutes after there has been no data loss process the track log file. This file keeps track of every single track that has been lost and whether or not it will be restored.
(8) Using the volume list log cycle through the track log and update it indicating which tracks will be restored from the remote copy of the data (the primary copy). Write this file out to the file system so if needed it can be analyzed at a later time (for debug purposes).
(9) Start a task that queries the state of each volume that was affected with data loss. This task will check every so often to determine when the data has been restored (when the secondary copy is in synchronization with the primary copy).

In certain embodiments, when the PPRC relationship un-suspends the applications performs the following:
(1) Cycle through the copy service Volumes Needing Restored structure and for each volume do the following: (a) Send a message to the remote system (primary system) indicating the volume number and range of tracks that need to be restored; (b) Upon receiving this message the remote system (primary system) updates its OOS bit map for this volume with the range of tracks that need restored; (c) On the next primary resynchronization of the data all tracks that are in the OOS for this volume are sent to the secondary system.
(2) The task that is querying the state of each affected volume detects that the local copy is now in synchronization with the primary copy and thus the data has now been recovered and sends a notification to the host that all data has now been restored.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
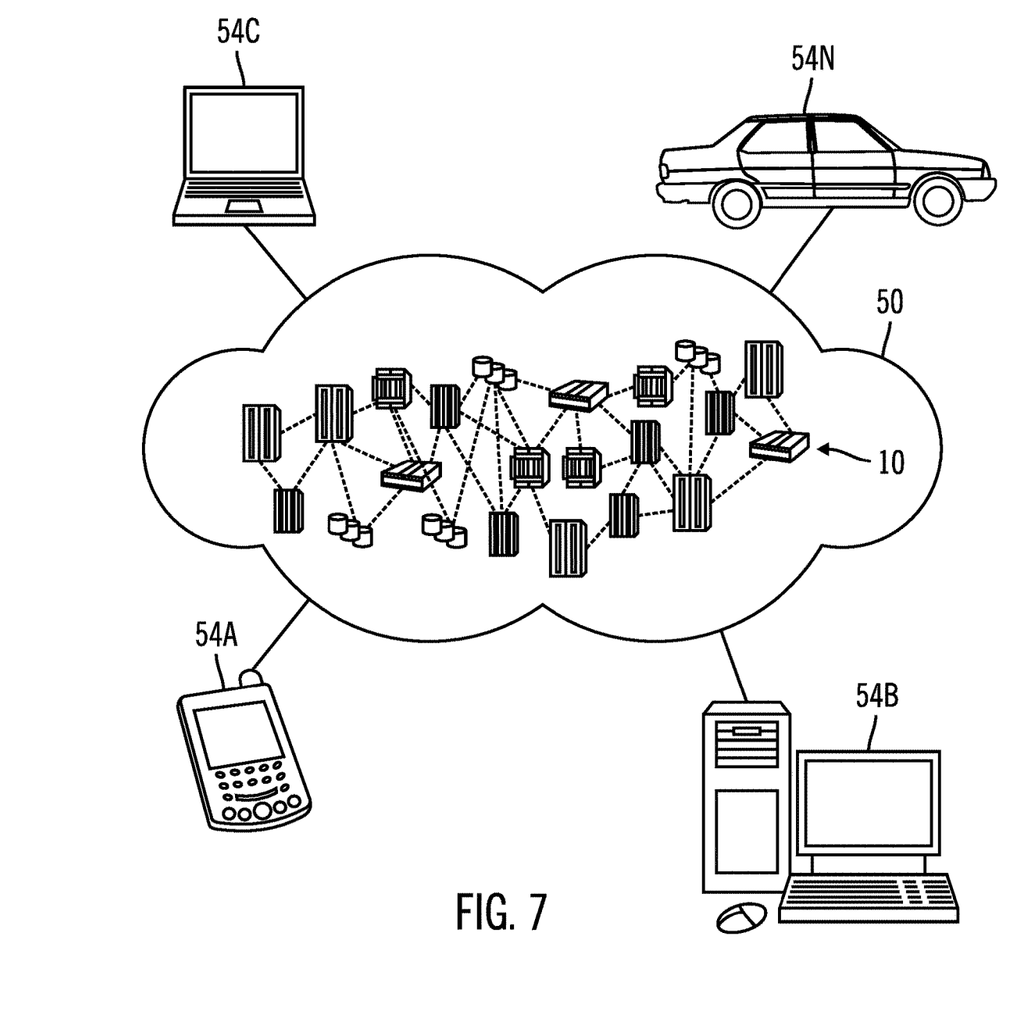
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
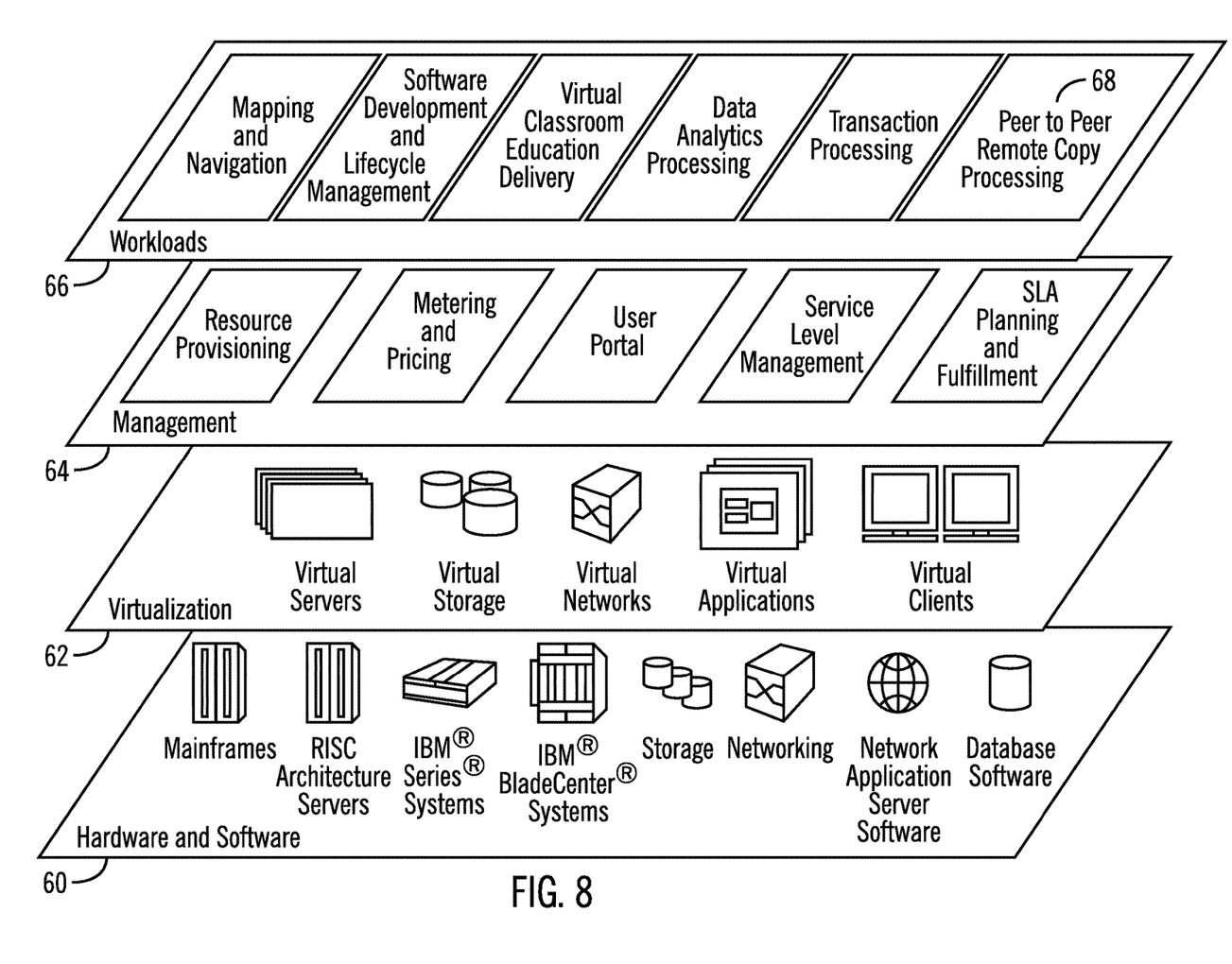
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the driver software and peer to peer remote copy processing 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
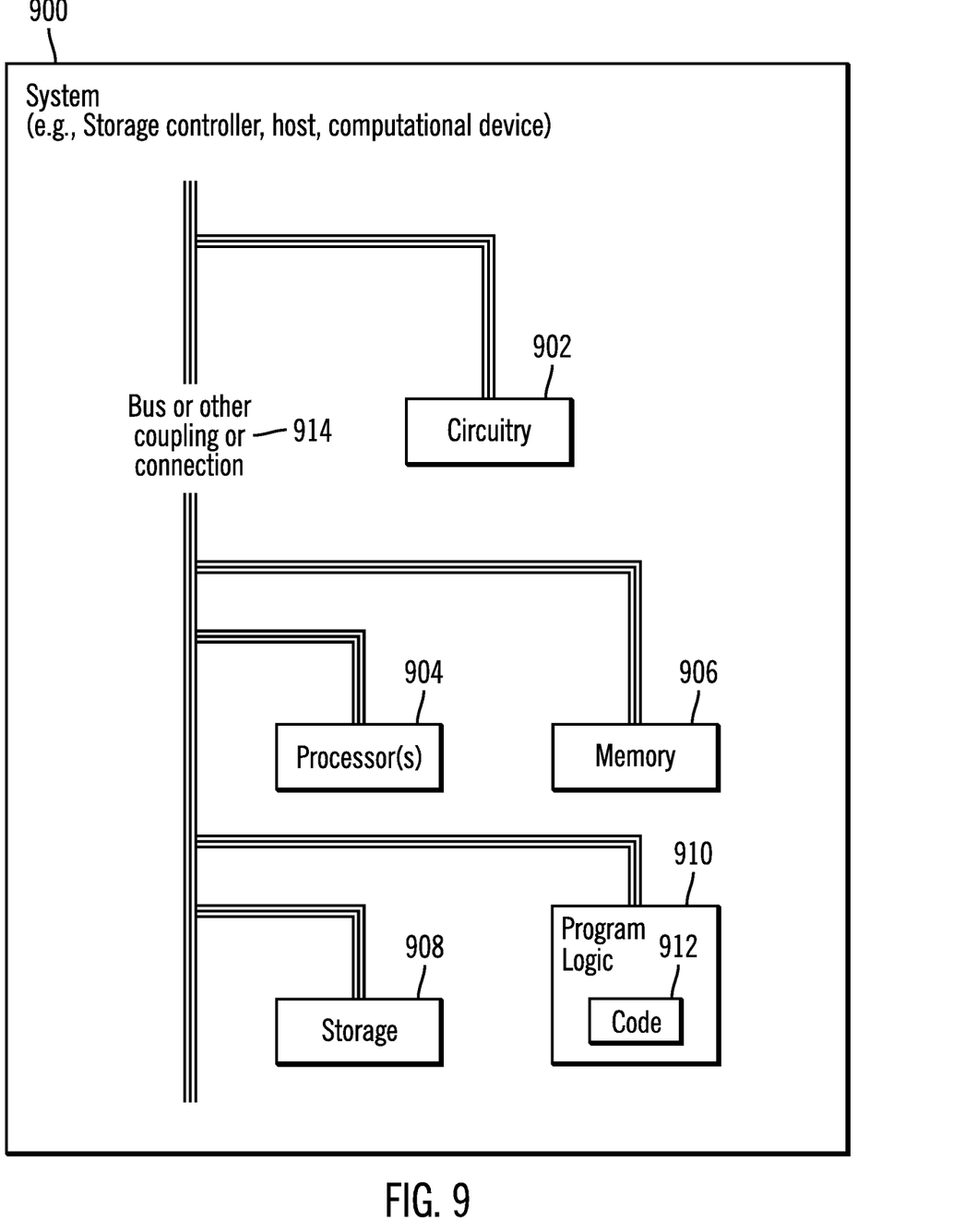
FIG. 9 illustrates a block diagram of a computational system that shows certain elements that may be included in the storage system and/or the host(s), as described in FIGS. 1-8, in accordance with certain embodiments.

FIG. 9 illustrates a block diagram that shows certain elements that may be included in storage controllers shown or used in FIGS. 1-6, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising,
in response to determining that a track in which data loss has occurred is a peer to peer remote copy secondary track in a secondary storage controller that is undergoing a synchronous peer to peer remote copy operation from a primary storage controller, creating a list of each peer to peer remote copy secondary track that has been affected by the data loss, and creating a lost track volume list that keeps track of all volumes that encountered data loss, and a range of tracks that needs to be recovered for the volumes from the primary storage controller;
dispatching a task to process the lost track volume list at a time that is a predetermined amount of time after a last data loss in a track has been observed or after no more data loss has been observed for at least the predetermined amount of time, wherein a timer is queued to process the lost track volume list for the predetermined amount of time, and for each additional track that is lost the timer is requeued once again for the predetermined amount of time to dispatch the task to process the lost track volume list once no data loss has been observed for at least the predetermined amount of time;
suspending, by the secondary storage controller, the synchronous peer to peer remote copy operation from the primary storage controller to the secondary storage controller, in response to determining via the tracks of one or more volumes in which the data loss has occurred in the secondary storage controller; and
transmitting information on the one or more tracks of the one or more volumes in which the data loss has occurred in the secondary storage controller, from the secondary storage controller to the primary storage controller, to avoid repeated interruptions of the primary storage controller from the secondary storage controller, and recovering the one or more tracks of the one or more volumes in which the data loss has occurred from the primary storage controller, wherein existing code to perform the synchronous peer to peer remote copy operation between the primary storage controller and the secondary storage controller remains unchanged in the primary storage controller, and wherein in response to an unsuspension of the synchronous peer to peer remote copy operation, for a volume performing:
sending a message to the primary storage controller indicating a volume number and a range of peer to peer remote copy secondary tracks that need to be restored, wherein the range of peer to peer remote copy secondary tracks that need to be restored is indicated by data structures indicating a start track and an end track; and
in response to receiving the message in the primary storage controller, updating an out of synchronization bit map for the volume with the range of peer to peer remote copy secondary tracks that need to be restored, wherein on a next primary resynchronization of data all peer to peer remote copy secondary tracks that are in the out of synchronization bit map for the volume are sent to the secondary storage controller, wherein in response to a process volume list task being dispatched once no data loss has been detected for the predetermined amount of time, cycling through a list and for volumes affected by data loss calling a copy service code component with a range of peer to peer remote copy secondary tracks comprising the start track and the end track that need to be restored from a remote copy of data, wherein a task sends a notification to a host coupled to the primary storage controller and the secondary storage controller that data has been restored in the secondary storage controller, and a suspend reason code indicates that the suspending of the synchronous peer to peer remote copy operation was performed because the data loss occurred on the secondary storage controller, and on the unsuspension of the synchronous peer to peer remote copy operation, recovery from the data loss will have taken place.

2. The method of claim 1, the method further comprising:
accumulating over a period of time, by the secondary storage controller, the information on the one or more tracks of the one or more volumes in which the data loss has occurred, prior to transmitting of any part of the information to the primary storage controller.

3. The method of claim 1, wherein the one or more tracks comprise a first track and a second track of a volume, the method further comprising:
in response to an unsuspension of the synchronous peer to peer remote copy operation, receiving by the secondary storage controller, data stored in the primary storage controller to restore data in a range of tracks starting from the first track to the second track of the volume of the secondary storage controller to recover from the data loss.

4. The method of claim 1, wherein a data structure is updated in the primary storage controller to indicate that data of the one or more tracks of the one or more volumes are to be transmitted on continuation of the peer to peer remote copy operation to the secondary storage controller.

5. The method of claim 1, the method further comprising:
determining, by a tertiary storage controller, a set of tracks of a volume in which data loss has occurred in the tertiary storage controller;
suspending, by the tertiary storage controller, another peer to peer remote copy operation between the tertiary storage controller and the secondary storage controller; and
transmitting, by the tertiary storage controller, information on the set of tracks of the volume in which the data loss has occurred to the secondary storage controller.

6. The method of claim 1, wherein the secondary storage controller is a first secondary storage controller, wherein a multi-target peer to peer remote copy operation is in progress from the primary storage controller to the first secondary storage controller and a second secondary storage controller, the method further comprising:
determining, by the second secondary storage controller, a set of tracks of a volume in which data loss has occurred in the second secondary storage controller;
suspending, by the second secondary storage controller, another peer to peer remote copy operation between the second secondary storage controller and the primary storage controller; and
transmitting, by the second secondary storage controller, information on the set of tracks of the volume in which data loss has occurred to the primary storage controller.

7. A system comprising,
a memory; and
a processor coupled to the memory, wherein the processor performs operations, the operations comprising:
in response to determining that a track in which data loss has occurred is a peer to peer remote copy secondary track in a secondary storage controller that is undergoing a synchronous peer to peer remote copy operation from a primary storage controller, creating a list of each peer to peer remote copy secondary track that has been affected by the data loss, and creating a lost track volume list that keeps track of all volumes that encountered data loss, and a range of tracks that needs to be recovered for the volumes from the primary storage controller;
dispatching a task to process the lost track volume list at a time that is a predetermined amount of time after a last data loss in a track has been observed or after no more data loss has been observed for at least the predetermined amount of time, wherein a timer is queued to process the lost track volume list for the predetermined amount of time, and for each additional track that is lost the timer is requeued once again for the predetermined amount of time to dispatch the task to process the lost track volume list once no data loss has been observed for at least the predetermined amount of time;
suspending, by the secondary storage controller, the synchronous peer to peer remote copy operation from the primary storage controller to the secondary storage controller, in response to determining via the dispatched task one or more tracks of one or more volumes in which the data loss has occurred in the secondary storage controller; and
transmitting information on the one or more tracks of the one or more volumes in which the data loss has occurred in the secondary storage controller, from the secondary storage controller to the primary storage controller, to avoid repeated interruptions of the primary storage controller from the secondary storage controller, and recovering the one or more tracks of the one or more volumes in which the data loss has occurred from the primary storage controller, wherein existing code to perform the synchronous peer to peer remote copy operation between the primary storage controller and the secondary storage controller remains unchanged in the primary storage controller, and wherein in response to an unsuspension of the synchronous peer to peer remote copy operation, for a volume performing:
sending a message to the primary storage controller indicating a volume number and a range of peer to peer remote copy secondary tracks that need to be restored, wherein the range of peer to peer remote copy secondary tracks that need to be restored is indicated by data structures indicating a start track and an end track; and
in response to receiving the message in the primary storage controller, updating an out of synchronization bit map for the volume with the range of peer to peer remote copy secondary tracks that need to be restored, wherein on a next primary resynchronization of data all peer to peer remote copy secondary tracks that are in the out of synchronization bit map for the volume are sent to the secondary storage controller, wherein in response to a process volume list task being dispatched once no data loss has been detected for the predetermined amount of time, cycling through a list and for volumes affected by data loss calling a copy service code component with a range of peer to peer remote copy secondary tracks comprising the start track and the end track that need to be restored from a remote copy of data, wherein a task sends a notification to a host coupled to the primary storage controller and the secondary storage controller that data has been restored in the secondary storage controller, and a suspend reason code indicates that the suspending of the synchronous peer to peer remote copy operation was performed because the data loss occurred on the secondary storage controller, and on the unsuspension of the synchronous peer to peer remote copy operation, recovery from the data loss will have taken place.

8. The system of claim 7, the operations further comprising:
accumulating over a period of time, by the secondary storage controller, the information on the one or more tracks of the one or more volumes in which the data loss has occurred, prior to transmitting of any part of the information to the primary storage controller.

9. The system of claim 7, wherein the one or more tracks comprise a first track and a second track of a volume, the operations further comprising:
in response to an unsuspension of the synchronous peer to peer remote copy operation, receiving by the secondary storage controller, data stored in the primary storage controller to restore data in a range of tracks starting from the first track to the second track of the volume of the secondary storage controller to recover from the data loss.

10. The system of claim 7, wherein a data structure is updated in the primary storage controller to indicate that data of the one or more tracks of the one or more volumes are to be transmitted on continuation of the peer to peer remote copy operation to the secondary storage controller.

11. The system of claim 7, the operations further comprising:
determining, by a tertiary storage controller, a set of tracks of a volume in which data loss has occurred in the tertiary storage controller;
suspending, by the tertiary storage controller, another peer to peer remote copy operation between the tertiary storage controller and the secondary storage controller; and
transmitting, by the tertiary storage controller, information on the set of tracks of the volume in which the data loss has occurred to the secondary storage controller.

12. The system of claim 7, wherein the secondary storage controller is a first secondary storage controller, wherein a multi-target peer to peer remote copy operation is in progress from the primary storage controller to the first secondary storage controller and a second secondary storage controller, the operations further comprising:
determining, by the second secondary storage controller, a set of tracks of a volume in which data loss has occurred in the second secondary storage controller;
suspending, by the second secondary storage controller, another peer to peer remote copy operation between the second secondary storage controller and the primary storage controller; and
transmitting, by the second secondary storage controller, information on the set of tracks of the volume in which data loss has occurred to the primary storage controller.

13. A computer program product, the computer program product comprising a computer readable storage medium having computer readable program code embodied therewith, the computer readable program code configured to perform operations, the operations comprising:
  in response to determining that a track in which data loss has occurred is a peer to peer remote copy secondary track in a secondary storage controller that is undergoing a synchronous peer to peer remote copy operation from a primary storage controller, creating a list of each peer to peer remote copy secondary track that has been affected by the data loss, and creating a lost track volume list that keeps track of all volumes that encountered data loss, and a range of tracks that needs to be recovered for the volumes from the primary storage controller;
  dispatching a task to process the lost track volume list at a time that is a predetermined amount of time after a last data loss in a track has been observed or after no more data loss has been observed for at least the predetermined amount of time, wherein a timer is queued to process the lost track volume list for the predetermined amount of time, and for each additional track that is lost the timer is requeued once again for the predetermined amount of time to dispatch the task to process the lost track volume list once no data loss has been observed for at least the predetermined amount of time;
  suspending, by the secondary storage controller, the synchronous peer to peer remote copy operation from the primary storage controller to the secondary storage controller, in response to determining via the dispatched task one or more tracks of one or more volumes in which the data loss has occurred in the secondary storage controller; and
  transmitting information on the one or more tracks of the one or more volumes in which the data loss has occurred in the secondary storage controller, from the secondary storage controller to the primary storage controller, to avoid repeated interruptions of the primary storage controller from the secondary storage controller, and recovering the one or more tracks of the one or more volumes in which the data loss has occurred from the primary storage controller, wherein existing code to perform the synchronous peer to peer remote copy operation between the primary storage controller and the secondary storage controller remains unchanged in the primary storage controller, and wherein in response to an unsuspension of the synchronous peer to peer remote copy operation, for a volume performing:
    sending a message to the primary storage controller indicating a volume number and a range of peer to peer remote copy secondary tracks that need to be restored, wherein the range of peer to peer remote copy secondary tracks that need to be restored is indicated by data structures indicating a start track and an end track; and
    in response to receiving the message in the primary storage controller, updating an out of synchronization bit map for the volume with the range of peer to peer remote copy secondary tracks that need to be restored, wherein on a next primary resynchronization of data all peer to peer remote copy secondary tracks that are in the out of synchronization bit map for the volume are sent to the secondary storage controller, wherein in response to a process volume list task being dispatched once no data loss has been detected for the predetermined amount of time, cycling through a list and for volumes affected by data loss calling a copy service code component with a range of peer to peer remote copy secondary tracks comprising the start track and the end track that need to be restored from a remote copy of data, wherein a task sends a notification to a host coupled to the primary storage controller and the secondary storage controller that data has been restored in the secondary storage controller, and a suspend reason code indicates that the suspending of the synchronous peer to peer remote copy operation was performed because the data loss occurred on the secondary storage controller, and on the unsuspension of the synchronous peer to peer remote copy operation, recovery from the data loss will have taken place.

14. The computer program product of claim 13, the operations further comprising:
  accumulating over a period of time, by the secondary storage controller, the information on the one or more tracks of the one or more volumes in which the data loss has occurred, prior to transmitting of any part of the information to the primary storage controller.

15. The computer program product of claim 13, wherein the one or more tracks comprise a first track and a second track of a volume, the operations further comprising:
  in response to an unsuspension of the synchronous peer to peer remote copy operation, receiving by the secondary storage controller, data stored in the primary storage controller to restore data in a range of tracks starting from the first track to the second track of the volume of the secondary storage controller to recover from the data loss.

16. The computer program product of claim 13, and wherein a data structure is updated in the primary storage controller to indicate that data of the one or more tracks of the one or more volumes are to be transmitted on continuation of the peer to peer remote copy operation to the secondary storage controller.

17. The computer program product of claim 13, the operations further comprising:
  determining, by a tertiary storage controller, a set of tracks of a volume in which data loss has occurred in the tertiary storage controller;
  suspending, by the tertiary storage controller, another peer to peer remote copy operation between the tertiary storage controller and the secondary storage controller; and
  transmitting, by the tertiary storage controller, information on the set of tracks of the volume in which the data loss has occurred to the secondary storage controller.

18. The method of claim 1, wherein the copy service code component adds the volumes and the range of tracks to a metadata comprising a "Volumes Needing Restored" structure that is non-volatile so that even on reboot, lost tracks are restored at some point.

19. The system of claim 7, wherein the copy service code component adds the volumes and the range of tracks to a metadata comprising a "Volumes Needing Restored" structure that is non-volatile so that even on reboot, lost tracks are restored at some point.

20. The computer program product of claim 13, wherein the copy service code component adds the volumes and the range of tracks to a metadata comprising a "Volumes Needing Restored" structure that is non-volatile so that even on reboot, lost tracks are restored at some point.

* * * * *